(12) United States Patent
Bohlke et al.

(10) Patent No.: US 9,845,037 B2
(45) Date of Patent: Dec. 19, 2017

(54) DEVICE FOR HOLDING AT LEAST ONE CONTAINER IN A VEHICLE INTERIOR AND ARMREST UNIT

(71) Applicants: Hartmut Bohlke, Wuppertal (DE); Wolfgang Sitzler, Wuppertal (DE); Wolfram Zummack, Troisdorf (DE); Bogdan Tutelea, Leichlingen (DE); Andreas Goebbels, Kuerten (DE); Tanja Pink, Wuppertal (DE); Hartmut Heine, Solingen (DE); Jan Boddenberg, Cologne (DE)

(72) Inventors: Hartmut Bohlke, Wuppertal (DE); Wolfgang Sitzler, Wuppertal (DE); Wolfram Zummack, Troisdorf (DE); Bogdan Tutelea, Leichlingen (DE); Andreas Goebbels, Kuerten (DE); Tanja Pink, Wuppertal (DE); Hartmut Heine, Solingen (DE); Jan Boddenberg, Cologne (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 15/182,085

(22) Filed: Jun. 14, 2016

(65) Prior Publication Data

US 2016/0362030 A1    Dec. 15, 2016

(30) Foreign Application Priority Data

Jun. 15, 2015   (DE) ......................... 10 2015 210 976

(51) Int. Cl.
*B60N 3/10*       (2006.01)
*B60N 2/46*       (2006.01)

(52) U.S. Cl.
CPC ............. *B60N 3/102* (2013.01); *B60N 2/468* (2013.01)

(58) Field of Classification Search
CPC ..................................................... B60N 3/102
(Continued)

(56) References Cited

U.S. PATENT DOCUMENTS 4,792,174 A * 12/1988 Shioda ................... B60N 3/002
                                                                108/45
5,141,194 A *  8/1992 Burgess ................. B60N 3/102
                                                                248/150
(Continued)

FOREIGN PATENT DOCUMENTS

DE      196 46 778 A1    5/1998
DE      198 05 017 A1    8/1999
(Continued)

*Primary Examiner* — Jason S Morrow
(74) *Attorney, Agent, or Firm* — Flynn, Thiel, Boutell & Tanis, P.C.

(57) ABSTRACT

Device for holding at least one container in a vehicle interior and armrest unit. The device has a carrier housing which encloses a receiving cavity open towards one end face, and having a carrier slide which is mounted to the carrier housing to be movable between a rest position plunged in the receiving cavity and a functional position moved out of the end face of the receiving cavity, wherein the carrier slide has at least one container recess and at least one bottom support part pivotably mounted to the carrier slide. The bottom support part is designed as a sheet-type component made of a flat material having uniform thickness connected to the carrier slide by at least one articulated hinge.

15 Claims, 2 Drawing Sheets

(58) Field of Classification Search
USPC .................................. 296/24.34; 248/311.2
See application file for complete search history.

(56) References Cited

U.S. PATENT DOCUMENTS

| | | | |
|---|---|---|---|
| 6,634,690 B2 | 10/2003 | Schaal | |
| 6,779,769 B1* | 8/2004 | York | B60N 3/102 |
| | | | 224/926 |
| 6,817,584 B2 | 11/2004 | Ogura | |
| 6,942,267 B1 | 9/2005 | Sturt | |
| 8,091,702 B1* | 1/2012 | Keip | A47G 23/0208 |
| | | | 206/171 |
| 2003/0042382 A1* | 3/2003 | Shirase | B60N 3/102 |
| | | | 248/311.2 |
| 2003/0090130 A1 | 5/2003 | Schaal | |
| 2014/0191529 A1* | 7/2014 | Okuhara | B60N 3/102 |
| | | | 296/37.15 |

FOREIGN PATENT DOCUMENTS

| | | |
|---|---|---|
| DE | 101 55 798 A1 | 5/2003 |
| DE | 10 2008 058 477 A1 | 5/2010 |
| JP | 07304374 A * | 11/1995 |

\* cited by examiner

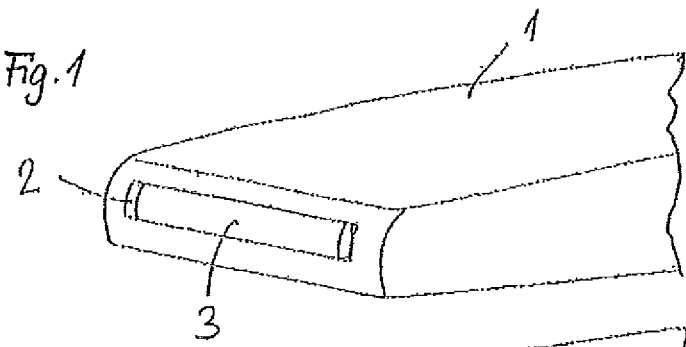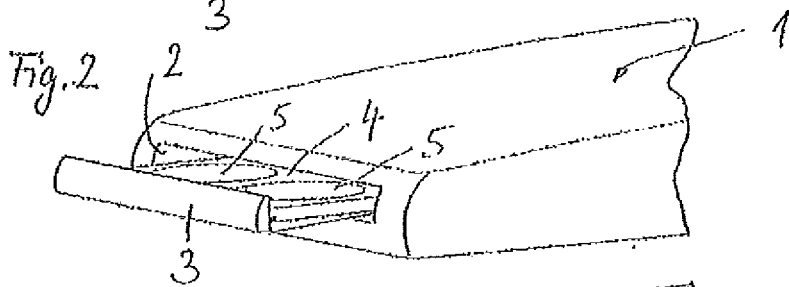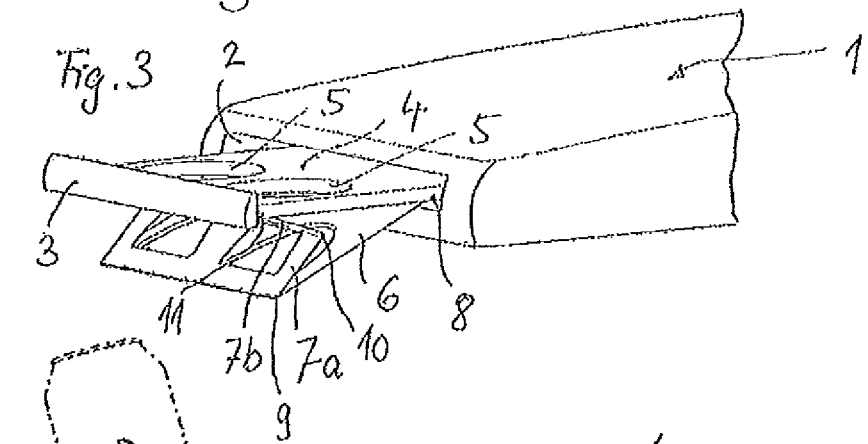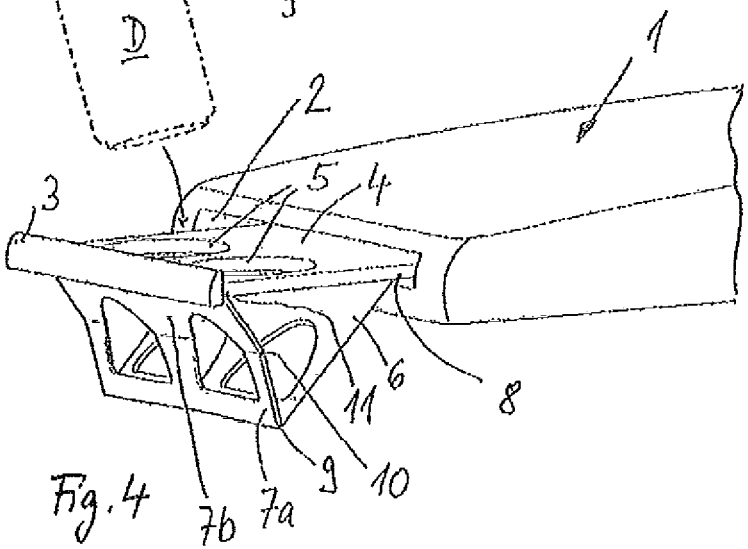

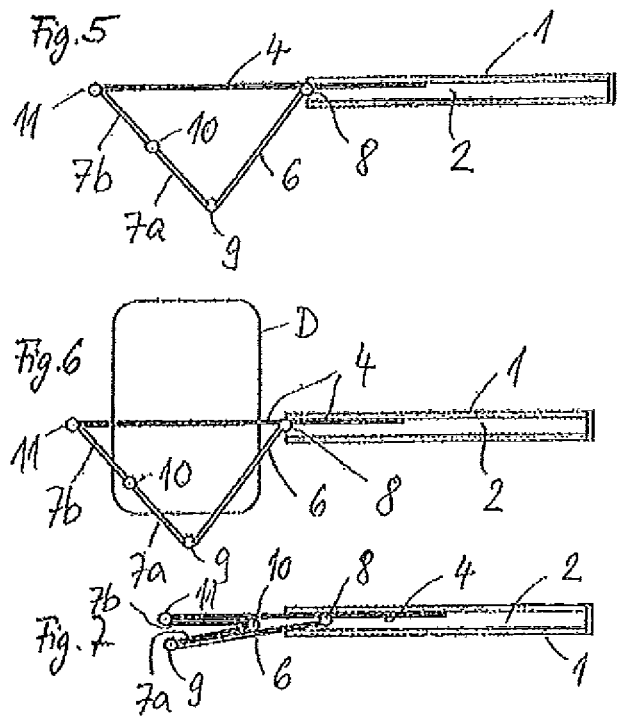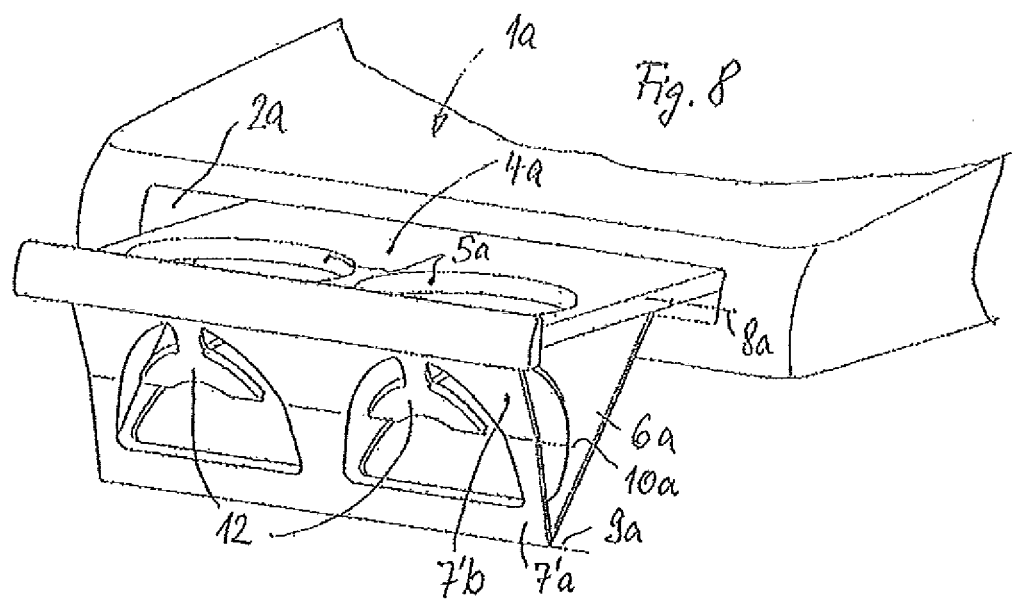

DEVICE FOR HOLDING AT LEAST ONE CONTAINER IN A VEHICLE INTERIOR AND ARMREST UNIT

CROSS-REFERENCE TO RELATED APPLICATIONS

This claims priority from German Patent Application No. 10 2015 210 976.3, filed Jun. 15, 2015, the disclosure of which is hereby incorporated by reference in its entirety into this application.

FIELD OF THE INVENTION

The invention relates to a device for holding at least one container in a vehicle interior, having a carrier housing which encloses a receiving cavity open towards one end face, and having a carrier slide which is mounted to the carrier housing to be movable between a rest position plunged in the receiving cavity and a functional position moved out of the end face of the receiving cavity, wherein the carrier slide has at least one container recess and at least one bottom support part pivotably mounted to the carrier slide.

BACKGROUND OF THE INVENTION

Such a device for holding a container in a vehicle interior is known for passenger automotive vehicles (Porsche 997). The known device includes a carrier housing which is integral to a carrier of controls and instruments of the vehicle interior. The carrier housing encloses a receiving cavity open towards a passenger seat, wherein a carrier slide is mounted to be movable between a rest position plunged in the receiving cavity and a functional position swiveled out of the receiving cavity. The carrier slide has a container recess and a drinking container can be inserted into the carrier slide across said recess. The container recess is bounded by a circumferential rim of variable width. In addition, a pivotably mounted bottom support bracket is disposed on the carrier slide, which bracket, in a non-use condition, adapts to the carrier slide from the underside and which, in a use condition, is placed obliquely downwards in relation to the carrier slide. When in its use condition, the bottom support bracket is positioned below the container recess such that a container inserted into the container recess can rest on the bottom support bracket.

SUMMARY OF THE INVENTION

It is the object of the invention to provide a device of the above mentioned type which needs a further reduced installation space.

This object is achieved in that the bottom support part is designed as a sheet-type component made of a flat material having uniform thickness which is connected to the carrier slide by means of at least one articulated hinge. The sheet-type component is characterized in that it is designed as a thin-walled plate component which is made of synthetic material, made of a metal alloy, made of a coated paper or cardboard material, or as a multi-layer composite component. In case the thin-walled plate component is produced of synthetic material, the respective plastic material may be fiber-reinforced. When the thin-walled plate material is produced from a metal alloy, preferably blanks of sheet metal are provided which may be finished by surface treatment or by surface coating. The at least one articulated hinge can be designed as an integral hinge (film hinge), a flexure hinge or a hinge array with a thin hinge axis. Advantageously, the sheet-type component is positioned below the carrier slide and is pivoted downwards for transfer from a non-use condition, wherein the sheet-type component rests against the carrier slide from below, to a use condition, Preferably, the carrier slide includes two container recesses with either a common bottom support part assigned thereto, or with a respective distinct bottom support part assigned to each one. The solution according to the invention is particularly advantageous for use in a vehicle interior of a passenger vehicle, advantageously in the vicinity of a carrier of controls and instruments, in the vicinity of a center console, or in the vicinity of an armrest unit of a corresponding front or rear seat arrangement of the passenger vehicle. Likewise, the device according to the invention can also be employed in a vehicle interior of aircraft or water craft or of other land craft, like trucks, utility vehicles or railway vehicles.

In an embodiment of the invention, the sheet-type component includes a plurality of folding sections, each thereof connected to another at the edge side and/or to the carrier slide to form a fold structure, For transferring the sheet-type component from the non-use condition to the use condition, the fold structure is folded out below the carrier slide in a simple manner.

In a further embodiment of the invention, the articulated hinge defines a swivel axis which is oriented transversely to a translational move direction of the carrier slide. The carrier slide is preferably insertable into and removable from the receiving cavity by translational motion.

In a further embodiment of the invention, the folding sections are interconnected by predetermined bending lines running in parallel to the swivel axis of the articulated hinge. The articulated hinge and the predetermined bending lines are preferably film hinges. Film hinges can be provided as integrally shaped flexure hinges or also by flexible sheet-type structures in the form of films, fabrics or the like connected to the folding sections, which are connected to the adjacent folding sections and the carrier slide, respectively, in material-bonding engagement, in particular by adhesive bonding or by welding. An articulated hinge or a predetermined bending line can also be obtained by injection molding around respective boundary regions of adjacent folding sections using an elastomer material, which forms the corresponding predetermined bending line or the corresponding articulated hinge as a flexure hinge. According to the invention, an articulated hinge can also be constituted by hinge profiles integrally molded on the folding sections, which profiles are either interconnected by latching or are interconnected by a stub axle.

In a further embodiment of the invention, the predetermined bending lines, in particular the film hinges, are designed such that they are bendable in one direction only. As a result, one single bending direction is predefined for the adjacent folding sections of the fold structure so that bending out of the folding sections in relation to each other in an undesired direction can be prevented thereby.

In a further embodiment of the invention, the fold structure includes a front side folding section and a rear side folding section—in relation to a moving out direction of the carrier slide—which are connected to the carrier slide on each of their opposed end face regions by a respective articulated hinge. As a result, there is preferably a V-shaped or U-shaped downward bulge in the use condition of the fold structure, which bulge is able to support a corresponding container, which is inserted in the container recess, from below. Namely, in particular the V-shaped bulge offers a tip in the cross section in a lower end face region which produces a particularly high rigidity of the fold structure in said lower region.

In a further embodiment of the invention, the front side folding section is provided with a central predetermined kink extending in parallel to the predetermined bending lines, by which the folding sections are interconnected. What applies also to the predetermined kink is that the kink is bendable in one direction only. Said predetermined kink is preferably formed in one piece in the front side folding section.

In a further embodiment of the invention, the front side folding section is provided with supporting contours formed in one piece which serve to laterally support at least one container. The supporting contours are produced preferably by cutting or punching in the front side folding section. The supporting contours may be positioned in the vicinity of the predetermined kink and project inwards opposite to the surface of the front side folding section in the use condition of the fold structure in order to allow lateral support of a container wall of a container inserted into the container recess. In case the carrier slide includes two adjacent container recesses, the front side folding section, extending over a width of both the container recesses, is preferably provided with two supporting contours, each assigned to one container recess. The supporting contours are designed to have low elastic resiliency and are in particular to allow stable support even of smaller containers.

In a further embodiment of the invention, a mechanical locking system is provided for securing the carrier slide within the carrier housing in the rest position. The mechanical locking system is transferable to a released position and to a closed position, preferably manipulated by an operator. Particularly advantageous is a push-push mechanism of the locking system. Such a push-push mechanism is provided with control contours in the type of a heart-shaped cam, in a generally well-known manner.

In a further embodiment of the invention, a thrust spring unit is assigned to the carrier slide in order to transfer the carrier slide, upon release by the locking system, from the rest position to the moved-out functional position in a self-acting manner. The thrust spring unit Is active after manually unlocking the locking system in order to move the carrier slide from the rest position to the functional position. The carrier slide is limited in the moved-out functional position within the carrier housing by means of an end stop in order to prevent that the thrust spring unit urges the carrier slide completely out of the receiving cavity.

The invention also relates to an armrest unit for a vehicle interior, wherein a device for holding at least one container is integrated, as described above with reference to the various paragraphs.

Further advantages and features of the invention will become apparent from the claims and the description below of preferred exemplary embodiments of the invention which are illustrated with reference to the drawings.

BRIEF DESCRIPTION OF THE DRAWINGS

FIG. 1 shows sections of an embodiment of a device according to the invention for holding two containers in a rest position;

FIG. 2 shows the device according to FIG. 1 in a partially moved-out intermediate position of a carrier slide;

FIG. 3 shows the device according to FIGS. 1 and 2 in a further moved-out intermediate position of the carrier slide;

FIG. 4 shows the device according to FIGS. 1 to 3 in a moved-out functional position of the carrier slide;

FIGS. 5 to 7 show the device according to FIGS. 1 to 4 in a schematic illustration of different positionings of the carrier slide; and FIG. 8 shows another embodiment of a device according to the invention for holding two containers with a bottom support part having minor modifications as compared to the embodiment according to FIGS. 1 to 7.

DETAILED DESCRIPTION

A device for holding two containers in a vehicle interior of a passenger vehicle according to FIGS. 1 to 7 has a carrier housing 1, which is integral to an armrest unit, which is part of a pivotable center rest arrangement of a rear seat bench, or is positioned in the vicinity of a center console between front side vehicle seat arrangements. When using the carrier housing 1 in an armrest unit, the carrier housing 1 is covered with an exterior upholstery.

The carrier housing 1 encloses a receiving cavity 2 which is open towards one end face, thereby producing an outlet slot. The receiving cavity 2 is low in height and has a flat and elongate design. In the receiving cavity 2 a carrier slide 4 is mounted to the interior side of the carrier housing 1 to be longitudinally displaceable, which slide is disposed within the receiving cavity 2 when in a plunged-in rest position, and is moved out through the end face passage slot of the receiving cavity 2 from the carrier housing 1 to the position according to FIGS. 4 to 6 when in a moved-out functional position. The carrier slide 4 is constituted by a planar plate and has a terminal part 3 on the front side, which part covers the passage slot of the receiving cavity 2 in the plunged-in rest position (FIG. 1), The carrier slide 4 has a dimensionally stable and one-piece design. The carrier slide 4 has two adjacent container recesses 5 which in the illustrated exemplary embodiment are of circular shape. In each of the two container recesses 5 one container can be inserted. With reference to FIGS. 4 and 6, a can D is inserted in one of the two container recesses 5 to illustrate an appropriate container, Below the two container recesses 5, a bottom support part is assigned to the carrier slide 4 which part has the design of a sheet-type component in the form of a fold structure, in the illustrated exemplary embodiment according to FIGS. 1 to 7. The fold structure is composed of a plurality of folding sections 6, 7a and 7b, wherein the folding sections 7a and 7b form a common front side folding section and the folding section 6 a rear side folding section. All of the folding sections 6 are made of a thin-walled plate material and, in order to save weight, are provided with cut-outs not identified in more detail, which cut-outs leave a corresponding supporting web in-between. Boundary regions of the cut-outs are for lateral supporting of containers which are inserted into the container recesses 5 of the carrier slide 4.

The rear side folding section 6 has a one-piece design. The front side folding section 7a, 7b is two-parted and forms an upper folding region 7b and a lower folding region 7a, which in the illustrated exemplary embodiment are integrally interconnected by a predetermined kink extending transverse to the moving out direction of the carrier slide 4. The folding section 6 and also the front side folding section 7a, 7b is made of an at least largely dimensionally rigid plate material. The front side folding section 7a, 7b and the rear side folding section 6 are interconnected over the entire width thereof by a predetermined bending line in the form of a film hinge 9. The rear side folding section 6, in the rear side end boundary region thereof, is pivotably arranged by means of an articulated hinge 8 in the vicinity of an underside of the carrier slide 4 at a distance behind the container recesses 5. The upper folding region 7b of the front side folding section 7a, 7b is likewise pivotably mounted by means of an articulated hinge 11 in the vicinity of an underside of the carrier slide 4, namely at a distance in front of the container recesses 5 immediately behind the front side terminal part 3 which is fixedly connected to a front side end face of the carrier slide 4. The articulated hinges 8 and 11 have hinge axes which are oriented mutually in parallel and extend transverse to the moving direction of the carrier slide 4. The lower folding region 7a of the front side folding section 7a, 7b in a lower end face boundary region thereof is continuously connected by the film hinge 9 to a front side end face boundary region of the rear side folding section 6 over the entire width of the folding sections 6, 7a, 7b, thereby producing a predetermined bending line, which is a hinge axis oriented in parallel to the hinge axes of the articulated hinges 8 and 11. Also the predetermined kink 10, separating the upper folding region 7b and the lower folding region 7a of the front side folding section, is preferably embodied in a film hinge, thereby producing a hinge axis extending in parallel to the hinge axes of the articulated hinges 8 and 11.

Pressure is applied to the carrier slide 4 in the moving out direction by a thrust spring unit, in a manner not illustrated in more detail. In addition, a locking system is assigned to the carrier slide 4, likewise not illustrated in more detail, to secure the carrier slide 4 in the plunged-in rest position within the receiving cavity 2. The locking system has a mechanical design and is implemented by a push-push mechanism in the exemplary embodiment according to FIGS. 1 to 7.

In the vicinity of at least one hinge axis of the articulated hinge 8, the articulated hinge 11 or the film hinges 9, 10 (not illustrated) a spring device is provided which exerts torque on the rear side folding section 6 and/or the front side folding section 7a, 7b in order to urge the respective hinge axis in the direction of the downwards set use condition. Furthermore, at least the predetermined kink, constituted by the film hinge 10 between the upper folding region 7b and the lower folding region 7a, is embodied such that bending of the folding regions 7a and 7b is allowed merely inwards in the direction of the rear side folding section 6. This is to ensure that the folding regions 7a and 7b cannot bend out to the front in the opposite direction away from the terminal part 3, whereby moving in of the carrier slide 4 to the plunged-in rest position within the receiving cavity 2 could be impeded. With reference to FIGS. 2 and 3 and also FIG. 7 it is apparent that the bottom support part, constituted by the folding sections 6 and 7a, 7b, can be adapted very flat to the underside of the carrier slide 4 in a non-use condition, whereby, in spite of the low height of the passage slot, the carrier slide 4 together with the fold structure can be inserted into the passage slot of the receiving cavity 2. With reference to FIG. 2 it is apparent that a total thickness of the carrier slide 4 and the fold structure composed of the folding sections 6, 7a, 7b in the folded-up non-use condition is less than a height of the passage slot of the receiving cavity 2 and a height of the front side terminal part 3. Folding of the fold structure is such that the fold structure is prevented from inadvertent re-expanding within the receiving cavity 2. As a result, tilting or jamming of the fold structure, when the carrier slide 4 is again moved out of the plunged-in rest position in the direction towards the moved-out functional position, is reliably prevented.

The device 1a according to FIG. 8 corresponds essentially to the device 1 as described in detail above. To avoid repetitions, reference is made to the explanations in relation to the device according to FIG. 1 referring to FIGS. 1 to 7. Consequently, parts and sections of similar function and design are given the same reference numerals with the letter "a" added thereto. The folding regions 7'a and 7'b of the front side folding section 7'a, 7'b differ from the folding regions of the device 1 according to FIGS. 1 to 7 by an apostrophe in the reference numeral.

An essential difference of the device 1a according to FIG. 8 is in that the front side folding section, extending over the width of both container recesses 5a, is additionally provided with supporting contours or elements 12 in the vicinity of the recesses, which contours offer an additional support of lateral walls of smaller containers set down in the container recesses 5a. With such smallercontainers, the boundary regions of the recesses as such fail to offer sufficient lateral support so that the supporting contours 12 take effect. With larger containers, however, the supporting contours 12 are urged outwards with elastic resiliency by lateral walls of the containers so that the larger containers are directly supported by the boundary regions of the recesses.

With reference to FIGS. 4 to 6 it is apparent that the fold structure in the downwards expanded use condition together with the carrier slide 4 forms a triangle, wherein the fold structure tapers downwards in a V-shape. The recesses in the folding sections 6 and 7a, 7b are provided in order to laterally enclose respective containers, inserted into the container recesses 5a, in a form-fitting manner. In the vicinity of the lower film hinge 9, over the entire width of the folding sections 6, 7a, 7b, a V-shaped web is obtained which contributes to reinforcing the fold structure and ensures secure underside supporting of respective containers.

The supporting contours 12 within the recesses of the front side folding section 7'a, 7'b are produced in one piece by respectively cutting or punching, and are provided in order to allow secure support even of containers of smaller diameter and to prevent such smaller containers from slipping out downwards through the recesses.

The invention claimed is:

1. A device for holding at least one container in a vehicle interior, said device comprising a carrier housing enclosing a receiving cavity which opens outwardly through an end face of said carrier housing, a carrier slide mounted to said carrier housing for movement between a non-use position wherein said carrier slide is located within said receiving cavity and a functional use position wherein said carrier slide is extended outwardly from said end face, said carrier slide having at least one container recess configured to support therein an upper part of a container, said device further comprising a bottom support part disposed beneath said carrier slide and pivotably mounted thereto, said bottom support part including a flat and foldable sheet component comprising a uniform thickness throughout, said sheet component being an integral and unitary one-piece component and forming the sole component of said bottom support part which supports a lower part of a container located in said recess in the functional use position of said carrier slide, said sheet component being pivotably connected to said carrier slide by a first hinge, said sheet component including first and second folding wall sections having respective inner end regions interconnected to one another by a predetermined bending line provided on said sheet component, said predetermined bending line defining a second hinge extending along said sheet component in a direction parallel with an axis of said first hinge.

2. The device according to claim 1, wherein said first folding wall section, when said carrier slide is in the functional use position, is located a greater distance from said end face of said carrier housing than said second folding wall section, said first folding wall section having an outer end region spaced from said inner end region thereof, said outer end region being directly connected to said carrier slide by said first hinge, said first hinge defining a hinge axis about which said first folding wall section is pivotable relative to said carrier slide, the hinge axis of said first hinge being the sole hinge axis about which said outer end region of said first folding wall section pivots relative to said carrier slide, the hinge axis of said first hinge being disposed immediately adjacent both said outer end region of said first folding wall section and said carrier slide in both the functional use position and the non-use position of said carrier slide.

3. The device according to claim 2, wherein said second folding wall section has an outer end region spaced from said inner end region thereof, said outer end region of said second folding wall section being connected to said carrier slide by a third hinge spaced inwardly from said first hinge and defining an axis about which said second folding wall section is pivotable relative to said carrier slide.

4. The device according to claim 2, wherein said first folding wall section extends from said first hinge to said second hinge and is oriented in a single plane when said carrier slide is in the functional use position.

5. The device according to claim 3, wherein said first and second folding wall sections are disposed vertically beneath said carrier slide when in the functional use position and together define an upwardly-opening V-shaped web for receiving a lower part of a container located in said recess of said carrier slide.

6. The device according to claim 5, wherein said second hinge defines an apex of said V-shaped web when said carrier slide is in the functional use position.

7. The device according to claim 2, wherein said predetermined bending line is a first predetermined bending line and said sheet component includes a second predetermined bending line extending along said first folding wall section in a direction parallel with said first predetermined bending line, said second predetermined bending line being disposed substantially centrally between said first predetermined bending line and said first hinge.

8. The device according to claim 7, wherein said second predetermined bending line divides said first folding wall section into first and second wall parts, wherein when said carrier slide is moved from the functional use position to the non-use position said first and second wall parts pivot about said second predetermined bending line and in the non-use position of said carrier slide are disposed in juxtaposed and facing relation with one another within said receiving cavity.

9. The device according to claim 8, wherein said second hinge and said second predetermined bending line respectively comprise film hinges, said film hinge of said second predetermined bending line extending along said sheet component in a direction parallel with the axis of said first hinge, said film hinge of said second predetermined bending line being configured to prevent movement of said first and second wall parts, in the functional use position of said carrier slide, in a direction away from said second folding wall section.

10. The device according to claim 8, wherein said first and second wall parts of said first folding wall section in the functional use position of said carrier slide are oriented in a single plane.

11. The device according to claim 3, wherein the axes of said first and third hinges are oriented transversely to a direction of movement of said carrier slide between the functional use and non-use positions.

12. The device according to claim 3, wherein said third hinge comprises a film hinge.

13. The device according to claim 1, wherein said first folding wall section, when said carrier slide is in the functional use position, is located a greater distance from said end face of said carrier housing than said second folding wall section, and said first folding wall section includes a resilient supporting element formed in one-piece with said first folding wall section and disposed vertically beneath said recess of said carrier slide, said resilient supporting element being biased inwardly for laterally supporting a container located in said recess of said carrier slide when same is in the functional use position.

14. The device according to claim 1, wherein said second hinge comprises a film hinge.

15. An armrest unit for a vehicle interior, wherein said device according to claim 1 is integral therewith.

* * * * *